(12) United States Patent
BuAbbud et al.

(10) Patent No.: US 6,366,717 B1
(45) Date of Patent: Apr. 2, 2002

(54) APPARATUS FOR DISTRIBUTING OPTICAL FIBER TRANSMISSION PATHS

(75) Inventors: George H. BuAbbud, South Lake; Georgeanne M. Radloff, Grand Prairie, both of TX (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/532,996

(22) Filed: Mar. 22, 2000

(51) Int. Cl.[7] ................................................ G02B 6/28
(52) U.S. Cl. ........................................................ 385/24
(58) Field of Search ............................. 385/24; 359/114, 359/115, 124

(56) References Cited

U.S. PATENT DOCUMENTS

| | | | | |
|---|---|---|---|---|
| 5,724,167 | A | * | 3/1998 | Sabella |
| 5,838,848 | A | * | 11/1998 | Laude |
| 5,953,141 | A | * | 9/1999 | Iiu et al. |
| 6,253,000 | B1 | * | 6/2001 | Madsen et al. |
| 6,263,126 | B1 | * | 7/2001 | Cao |

* cited by examiner

*Primary Examiner*—Hung N. Ngo
(74) *Attorney, Agent, or Firm*—Jones, Day, Reavis & Pogue

(57) ABSTRACT

A method and apparatus for servicing or upgrading on demand, an optical fiber communication system from a single communication channel at one frequency such as a telephone circuit to two communication channel systems at two different frequencies such as telephone and TV signals.

18 Claims, 4 Drawing Sheets

APPARATUS FOR DISTRIBUTING OPTICAL FIBER TRANSMISSION PATHS

BACKGROUND OF THE INVENTION

1. Field of the Invention

The present invention relates to an apparatus for carrying on simultaneous signal transmissions over a single optical fiber by using two different operating frequencies, and more specifically to an apparatus for combining bidirectional telephone signals and cable TV signals carried by optical fibers on a single optical fiber extending from a distribution cabinet to a multiplicity of user stations or first locations. The apparatus includes optical couplers for combining the telephone signals and the TV signals onto a single fiber and support and guide structure for organizing a multiplicity of such coupler and input and output fibers for easy access.

2. Description of Related Art Including Information Disclosed Under 37 CFR 1.97 and 1.98

The telecommunications industry is using more and more optical or light fibers in lieu of copper wire. Optical fibers have an extremely high bandwidth thereby allowing significantly more information than can be carried by a copper wire.

Of course, modem telephone systems require bidirectional communications where each station on a communication channel can both transmit and receive. This is true, of course, whether using electrical wiring or optical fibers as the transmission medium. Early telephone communication systems solved this need by simply providing separate copper wires for carrying the communications in each direction. Some early attempts at using optical fibers as a transmission medium followed this example and also used two different optical fibers such as optical fibers 10 and 10A in the prior art FIG. 1 for carrying the communications in each direction. As shown, in the prior art FIG. 1, fiber 10 is connected by an optical coupler 12 to an LED (light-emitting diode) 14 at one end and by optical coupler 16 to a PD (photodetection diode) 18 at the other end. Similarly, but in reverse, fiber 10A is connected by an optical coupler 16A to PD 18A at one end and by optical coupler 12A to LED 14A at the other end.

However, because of extremely high bandwidths available for use by an optical fiber, a single fiber is quite capable of carrying communications in both directions. One technique is WDM (wavelength divisional multiplexing) which is shown in the prior art FIG. 2 and uses different wavelenghts for each direction of travel. Components in FIG. 2 and subsequent figures which operate the same as shown in FIG. 1 carry the same reference numbers. In the embodiment shown in FIG. 2, a central office 20 is connected to an RT (remote terminal) 22 by a single optical fiber 10B. As shown, the central office includes a light-emitting diode 14 optically connected to fiber optics 10 by optical coupler 12 for converting electrical signals to optical signals and a photo-detection diode 18 optically connected to optical fiber 10A by a coupler 16 for converting optical signals to electrical signals. The fiber optics 10 and fiber optics 10A are each connected to a wavelength division multiplexer 24 which is connected to optical fiber 10B. This arrangement is duplicated at the RT 22 by light-emitting diode 14A, coupler 12A, photodetection diode 18A, coupler 16A and wavelength division multiplexer 24A. It will, of course, be appreciated that although the figure is shown as providing communications between a central office 20 (station 1) and a remote terminal 22 (station 2), the communications system could be used for providing communications between any two types of stations such as, for example, two central offices, two remote terminal offices, or between a remote office and an individual user's location, etc. A typical communications system using an LED and a PD with a single optical fiber is disclosed in U.S. Pat. No. 5,075,791 entitled "Method and Apparatus for Achieving Two-Way Long-Range Communication Over an Optical Fiber", issued to Mark W. Hastings, and incorporated in its entirety hereby by reference.

Yet another and simpler technique for using a single optical fiber 10C for telephone systems is illustrated in the prior art FIG. 3. The illustrated figure is referred to as TCM (time compression multiplexing) and is sometimes referred to as a "ping-pong" system. The system operates at a single frequency and uses a single optical fiber 10 and a single diode 30 and 30A at each end connected by optical couplers 32 and 32A, respectively, for both converting electrical signals to optical signals and for receiving optical signals and converting those optical signals to electrical signals. TCM systems have the obvious advantage of requiring fewer components.

However, as mentioned above, optical fibers have extremely high bandwidths and use of an optical fiber for a single ping-pong telephone channel is a very ineffective use of the fiber and, in fact, the available bandwidth of an optical fiber makes it possible to use a transmission technique such as TCM or ping-pong at one frequency and then by the use of WDM technology to use another technique at a second frequency. Of course, where optical transmission systems such as a ping-pong or TCM system has been installed, it would not be desirable to disrupt the operation of such systems. Further, once a ping-pong fiber-optic telephone system is installed, removal and replacement with a new system would normally be prohibitive from a cost point of view. Therefore, it would be advantageous to be able to upgrade the existing TCM or ping-pong fiber-optic telephone system to also carry a second communication channel at another frequency.

SUMMARY OF THE INVENTION

It is an object of this invention to provide apparatus for upgrading a communication transmission system initially providing a communication channel operating at one frequency so that it can provide two communication channels operating at different frequencies.

It is another object of the invention to provide a method and apparatus to upgrade a communication transmission system while using as much of the existing telephone equipment and distribution frames as possible.

It is still another object of the invention to provide methods and apparatus to upgrade a fiber optic telephone transmission system to carry CATV signals with minimal addition of new components.

It is yet another object of the invention to allow upgrading of a optical fiber communication transmission system to occur on an on-demand-basis.

The present invention accomplishes these and other objects in apparatus for distributing optical transmission which comprises a plurality of first optical fibers which bidirectionally transmit light of a first wavelength. Each one of the plurality of first optical fibers has a first portion spliced to a second portion. There is also included a like or equal number or plurality of second optical fibers for transmitting light at a second wavelength and which, in a preferred embodiment, this second wavelength is used to carry cable TV signals. The plurality of first optical fibers and second optical fibers are provided to a similar plurality or like number of wave division optical couplers (WD) each of which has a first port connected to one of the plurality of first optical fibers and a second port connected to one of the plurality of second optical fibers. Each of the couplers combines light having a first wavelength and which is received from the first plurality of optical fibers at the first port with light having a second wavelength (the TV signals) and which is received from the second plurality of optical fibers at the second port to provide an output at a third port comprised of light carrying both first and second frequencies. The light output at the third port is provided to a similar plurality of third optical fibers which transmit the light at both first and second wavelengths to the user. Each one of the plurality of third optical fibers also has a first portion spliced to a second portion. The invention further includes a support structure or panel which supports the first, second and third plurality of optical fibers and a second enclosed portion which supports the optical couplers. In one embodiment, the apparatus also includes a first holding area for supporting splices joining the first portion and second portions of the first optical fibers and a first pathway which includes support members and guide members which extends from a first external location or port to the first holding area for guiding and supporting the first portions of the plurality of first optical fibers. A second pathway is also included which extends from the first holding area to the enclosed area (preferably by way of an internal port) for guiding and supporting the second portions of the plurality of first optical fibers. Thus, there is provided an organized way for providing optical fibers carrying the first wavelength of light to the enclosed portion of the support structure which houses the plurality of optical wavelength couplers. A second holding area is also provided with support splices joining the first and second portions of the third optical fibers. In a like manner as before, there exists a third pathway extending from a second external location or port to the second holding area for guiding and supporting the first portions of the plurality of third optical fibers and a fourth pathway extending from the second holding area to the enclosed portion of the support structure, such as by a second internal port. This fourth pathway for guiding and supporting the second portions of the plurality of third optical fibers. Thus, it is seen that after combining the first and second wavelengths of light received on the first and second optical fibers and then providing an output on the third optical fiber, the third optical fiber is routed back to the second holding area where it is spliced to the second portion of the third optical fibers and then provided to an external location or port where it leaves the panel.

Also in a preferred embodiment, a small number of fiber optical cables or even a single optical cable carrying the cable TV signals may be provided to the distribution panel of the present invention. In such an event, it will be necessary that the optical fiber carrying the TV signals be split as necessary to provide the same number of outputs of TV signals on second optical fibers as the plurality of first optical fibers. Thus, the present invention also includes at least one optical splitting device which splits the received TV signals to provide outputs to a plurality of second optical fibers equal to the number of first optical fibers. The splitting devices are also contained and supported by the enclosed portion of the distribution panel.

Although the plurality of first optical fibers may be provided in any suitable manner, one preferred arrangement where the first plurality of first optical fibers is equivalent to 96 fibers is provided by 12 ribbons of optical fibers each of which has 8 fibers for a total of 96 first optical fibers.

Likewise the third optical fiber which carries both wavelengths of light according to a preferred embodiment is equally divided into 8 ribbons of 12 optical fibers each so as to also have 96 total fibers.

Another feature of the present invention is to provide a panel which can use the existing main distribution frames (MDF) already in existence and used by telephone distribution companies. Therefore, the apparatus or distribution panels of the present invention have dimensions and include brackets such that they can be mounted either vertically or horizontally in a standard telephone main distribution frame. It will also be appreciated, that the present panels can also be mounted in a typical vertical distribution frame used to house optical fibers.

The apparatus according to the present invention comprises a multiplicity of optical couplers or combining units which combine the optical signals carrying information on the first and second optical fibers to produce an output on a single optical fiber which carries the bidirectional telephone signals and the TV signals at different frequencies. Therefore, each one of the plurality of combining units is connected to one of the first optical fibers carrying the bidirectional telephone information at a first frequency, and one of the second optical fibers carrying information at a second frequency. From each combining unit, there is provided a third optical fiber carrying information at both the first and second frequencies. These combining units are mounted in a first enclosed portion of the distribution apparatus.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which.

DETAILED DESCRIPTION OF THE PREFERRED EMBODIMENT(S)

Figure 1:
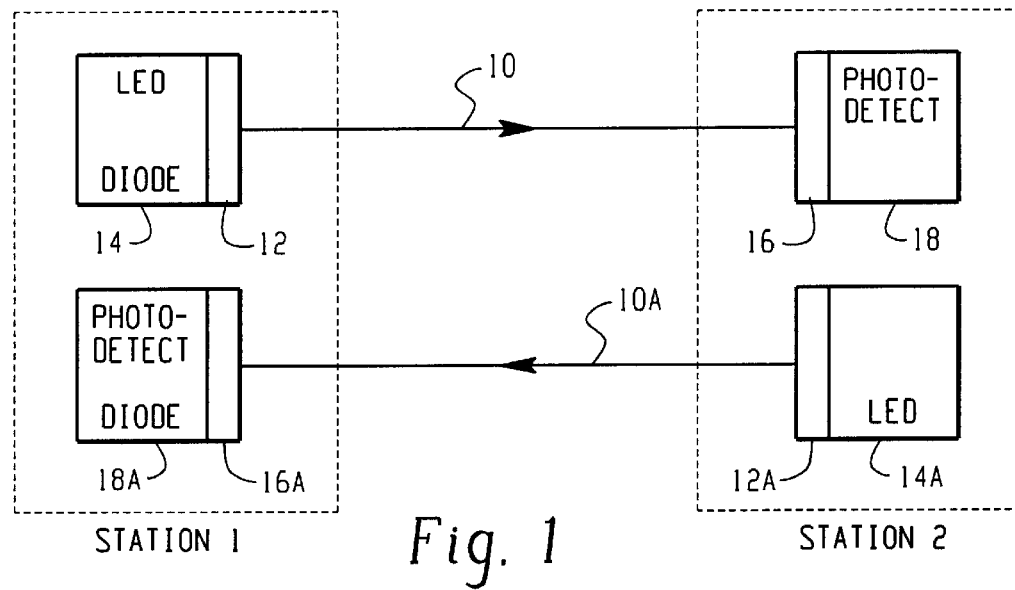
FIG. 1 is a block diagram of a prior art fiber optical communication system using two fibers to obtain bidirectional communication.
Figure 2:
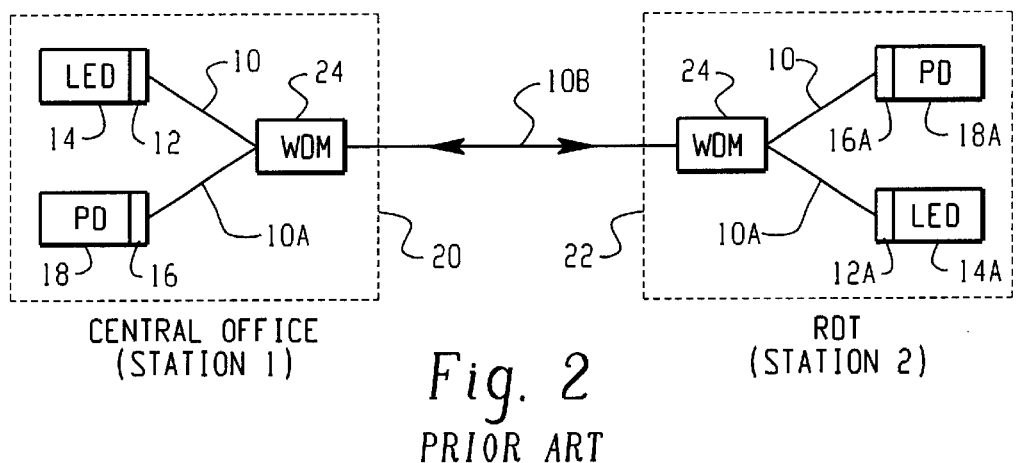
FIG. 2 is a prior art block diagram of a fiber-optic communication system using a single transmission fiber having a light-emitting diode and a photodetection diode at each end of the fiber.
Figure 3:
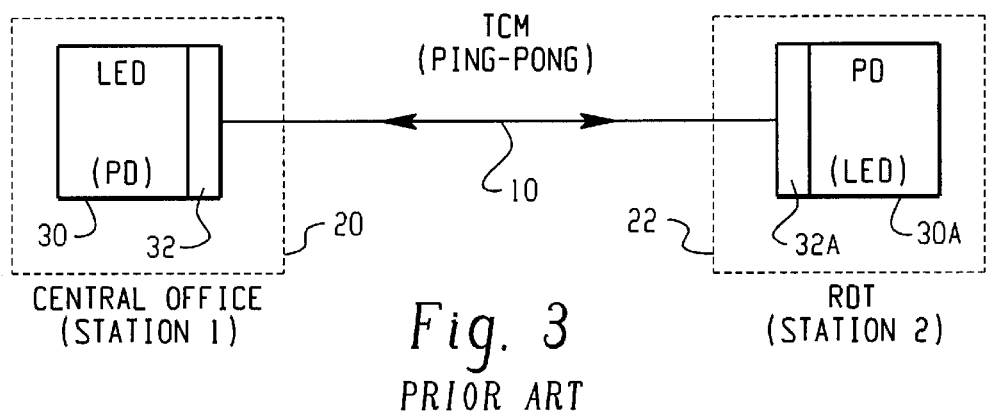
FIG. 3 is a prior art block diagram of a fiber optical communication system using a single fiber and a single transmit/receive diode at each end suitable for TCM or ping-pong types of transmission.
Figure 4:
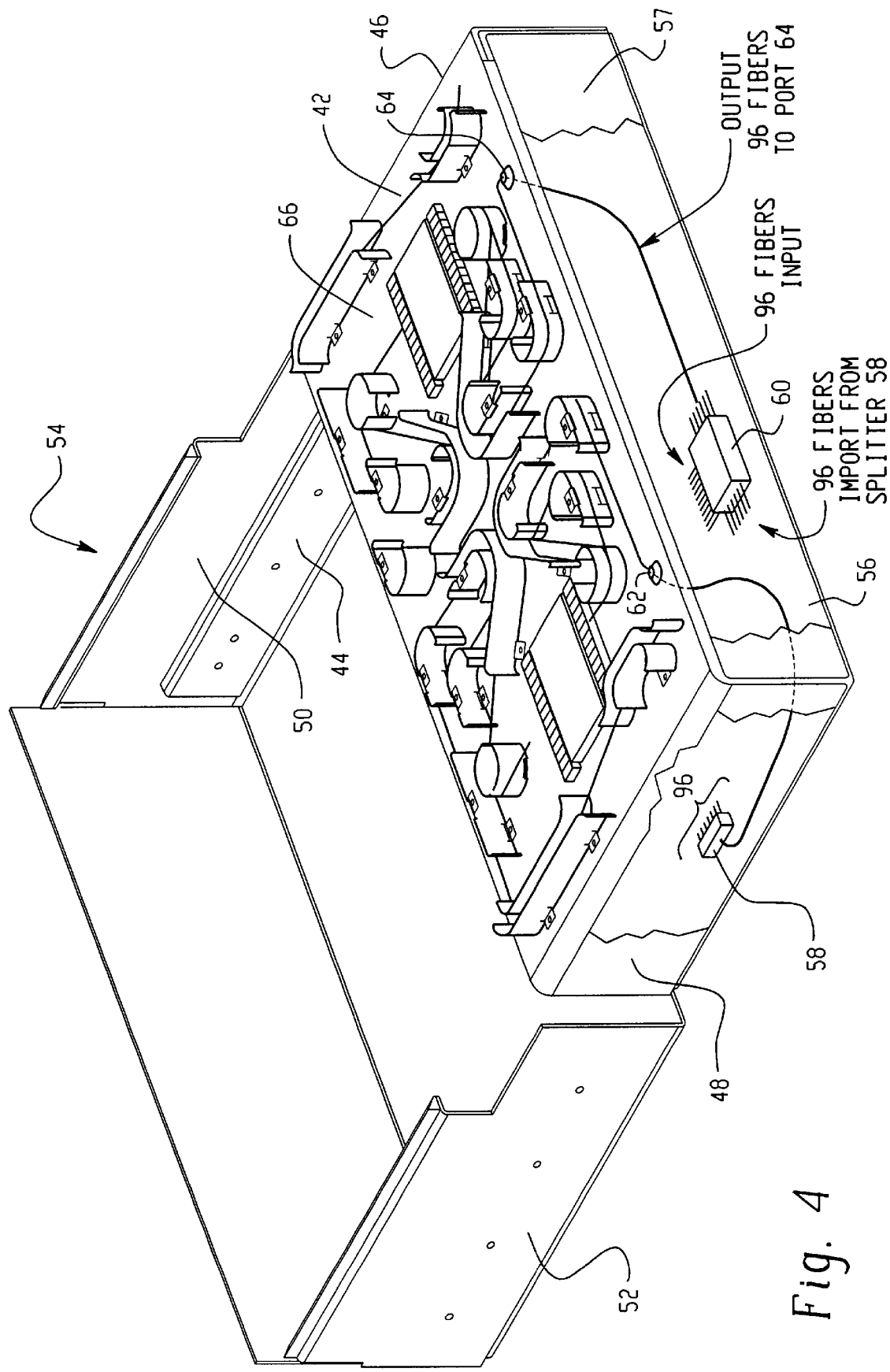
FIG. 4 is a perspective view of a fiber optic panel incorporating the features of the present invention.

Referring now to FIG. 4, there is shown generally at 42 a distribution panel incorporating the features of the present invention. According to a preferred embodiment, the distribution panel 42 is supported by a pair of drawer slides such as drawer slide 44 which will be connected to end 46 of panel 42. A similar drawer slide (not shown) will be connected to end 48 of panel 42. In addition to the drawer slides being connected to the ends 46 and 48 of distribution panel 42, each slide will also be connected to the end panels 50 and 52 respectively of the outside support frame indicated generally at 54. Outside support frame 54 will be discussed in more detail later, but has suitable dimensions and connecting brackets for attaching to a variety of main distribution racks such as standard fiber optic distribution boxes and/or present and existing telephone main distribution frames (MDF's). The combination of the outside support frame 54 connected to the distribution panel of this invention by drawer slides 44 is, as will be appreciated by those skilled in the art, for purposes of allowing the panel 42 to slide away from the support bracket 54 for maintenance or servicing.

Referring now to distribution panel 42, it can be seen that there is an enclosed first portion 56 having a portion of end panel 48 and front panel 57 broken away, which supports one or more optical splitters 58 and an array of optical couplers 60. The operation and arrangement of the optical splitters 58 and optical couplers 60 will be discussed in detail hereinafter. However, it should be noted that, according to a preferred embodiment, there are a pair of internal ports 62 and 64 which, as will be discussed hereinafter, carry a plurality of individual optical fibers.

Figure 5:
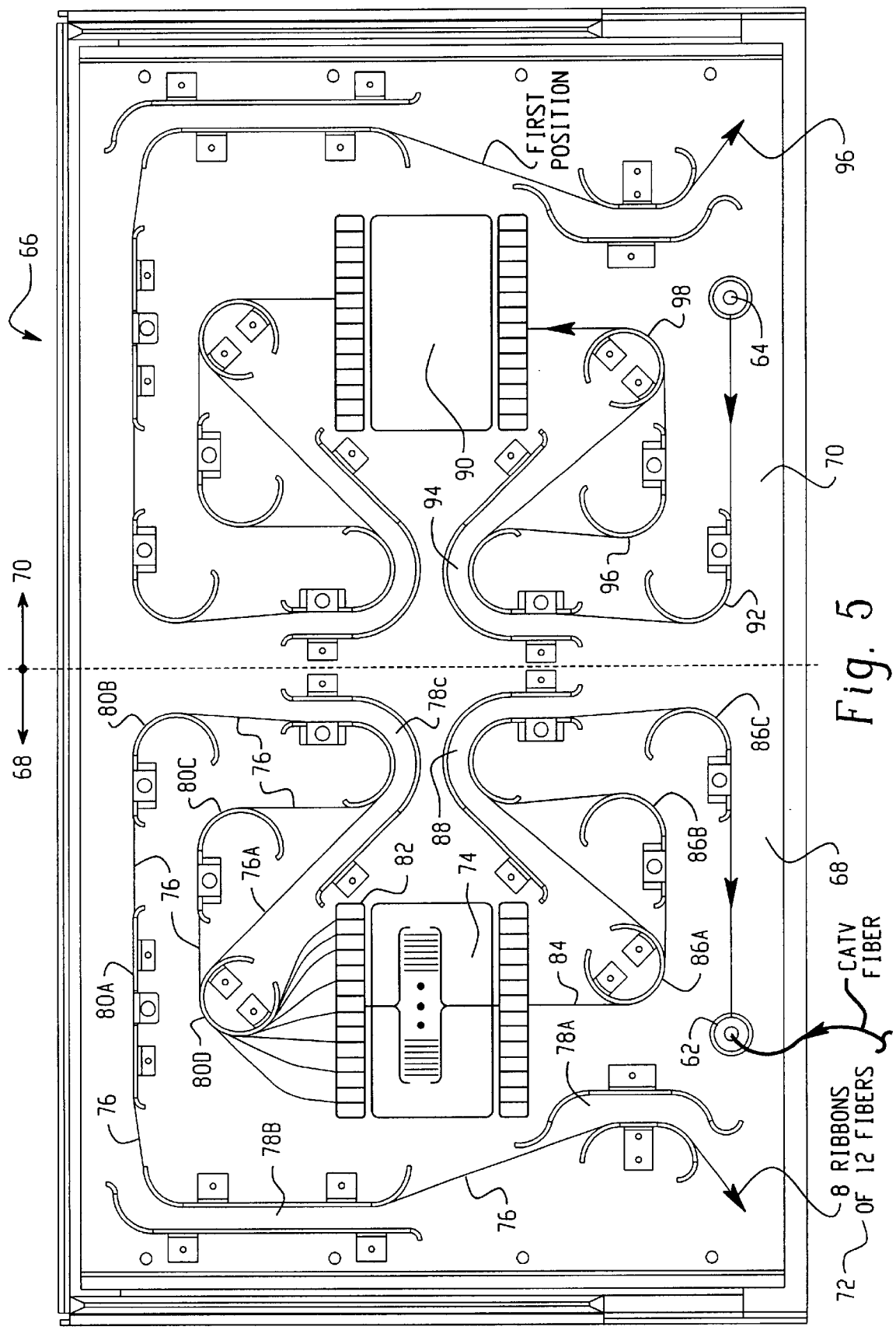
FIG. 5 is a top view of the fiber optic panel of FIG. 4 and illustrates alternative routing of fiber optic cables.

Referring now to FIG. 5, there is shown a second portion 66 of panel 42 which, in the embodiment shown, is external and exposed but may also be enclosed if desired. Portion 66 of the distribution panel is provided for supporting and guiding individual optical fibers in an organized manner for ease of servicing and maintenance of the panel and the fibers. In the embodiment shown, the external portion 2 of the panel is divided into an area 68 for incoming optical fibers and an area 70 for outgoing optical fibers. The terms "incoming" and "outgoing" are used for convenience only, since as will be appreciated by those skilled in the art, the fiber optic cables carrying telephone signals are bidirectional. Depending upon usage, the transmission could be bidirectional on both wave lengths. A plurality of first optical fibers as indicated by reference numeral 72 carry bidirectional telephone transmissions at a first wavelength. In the embodiment shown, there are 8 ribbons of 12 fibers each for a total of 96 fibers. It will be appreciated of course these fibers could be provided as individual fibers or in other arrangement of ribbon fibers. The 96 fibers will typically extend for some distance between the panel 66 and another distribution panel closer to the telephone central office. The fibers indicated at reference numeral 72 are referred to as the first portions and extend from an external location or port (not shown) to a holding or splicing area 74 which will be discussed later and are hereby designated as a first portion of the fibers. In the embodiment shown, a single fiber 76 is illustrated which follows the guide elements and support members, to be discussed later, from the input area to the first splicing or holding area 74. It will be appreciated of course, however, that although only a single fiber is illustrated, all 96 fibers will follow substantially the same path as the individual illustrated fiber 76. The support structure includes a series of guides 78a, 78b and 78c which maintains all the 96 fiber optical cables in an organized manner. Also included are some additional support members 80a, 80b and 80c. Thus, the individual 96 fibers are routed in an organized manner from the input to the splicing area 74. It is of course seen that the routing of the fibers is not in a direct route between the input and the splicing area 74. The indirect routing allows for the fibers to be individually removed from their support members and guide members so as to provide sufficient length for the necessary servicing and splicing. It should also be noticed that there may be more than one route between the input and the splicing area 74 as is indicated by fiber optic cable portion 76a which is shown running directly between guide element 78c and support member 80d rather than from guide element 78c to support member 80c and then to support element 80d. As will be appreciated by those skilled in the art, each time an optical fiber is re-spliced, a small amount of the fiber must be cut away. Thus, if over a period of time a large number of splices occur with respect to an individual first portion of a fiber, the shorter route allows for additional material to be used for further splicing. It should also be noted, that although one fiber is shown going to the splicing area 74, there is a support member 82 which, in the embodiment shown, has at least 8 slots for receiving the 8 ribbons of fiber optics. Thus, as shown, for each of the 8 ribbons there will be 12 splices in the splice area 74 joining the first portion of the optical fiber to the second portion 84 of the optical fiber. Again, as was the case with respect to the first portion of the optical fiber 76 only a single second portion 84 of the optical fiber will be illustrated to avoid clutter in the illustrated example. As shown, the optical fiber follows a path around a series of support elements such as support element 86a, 86b and 86c and through a guide element 88 to the internal port 62.

Now referring to the second portion 70 of the panel, the fiber optic cables exit from the enclosed portion 56 through internal port 64 and are provided to the second holding or splicing area 90 in a similar manner as was discussed before with respect to the first optical fiber. The fibers exiting from port 64 in the present embodiment will also be 96 in number and will follow a route around support element 92, guide element 94 and support elements 96 and 98 to the second holding or splicing area 90. The fibers routed and supported in section 70 are again designated as a first portion (which runs from an external location or port 96 around a series of support elements and guide elements to the splice area 90) and a second portion running from holding area 90 to internal port 64. Thus, splice area 90 is provided to support splices between the first portion and second portion of the third optical fibers which carry both wavelengths of light.

Figure 6:
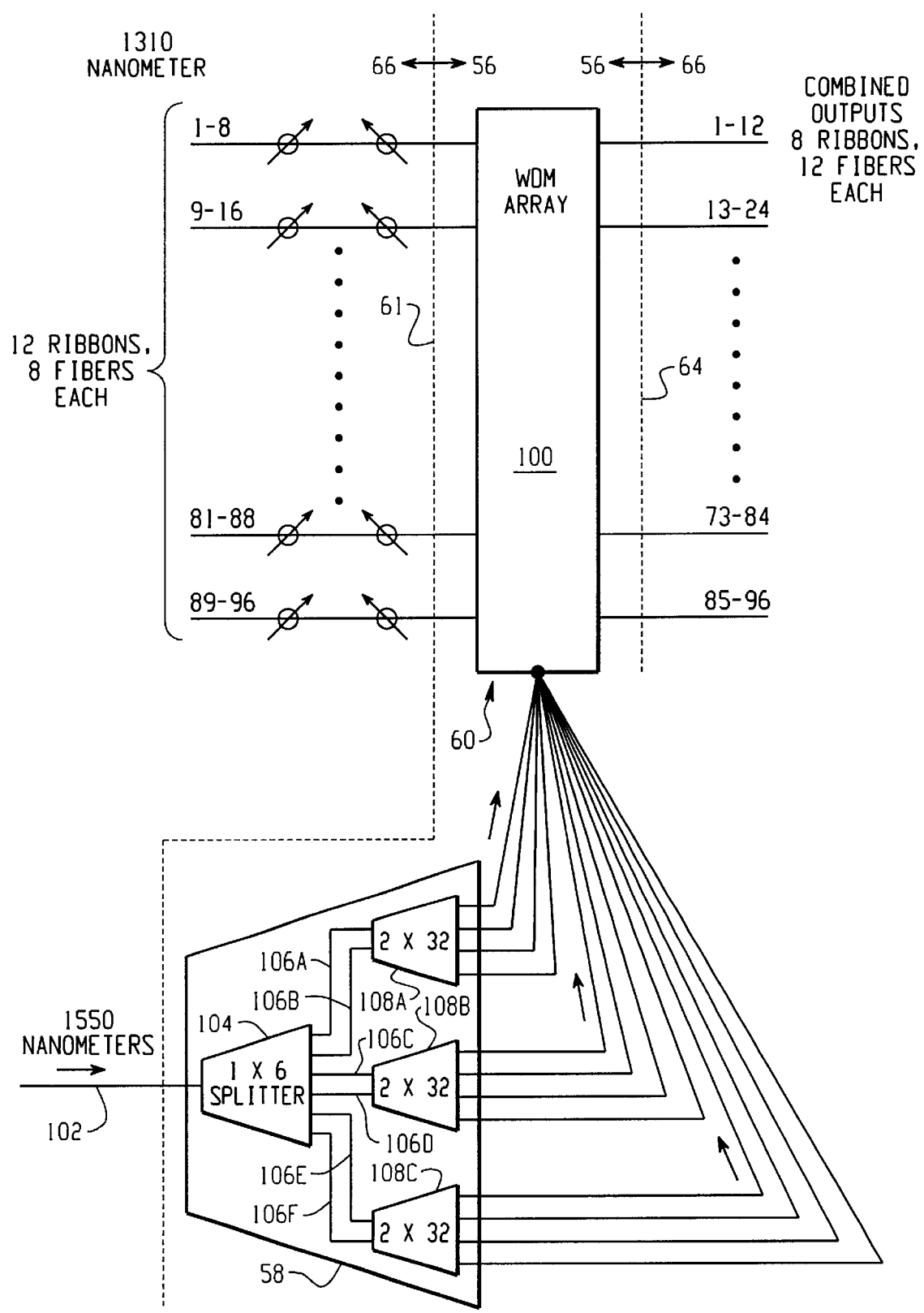
FIG. 6 is a pictorial schematic diagram of the input fiber optic cables, the output fiber optic cables and the wave division multiplier (WDM) coupler and optical splitter.

Referring again to FIG. 4, and as discussed above, the enclosed portion 56 of distribution panel 42 supports the multiplicity of wave division couplers 60. In the embodiment of FIG. 4 and the optical schematic of FIG. 6, the plurality of wave division optical couplers is preferably a Wave Division Multiplexer (WDM) array 100 having at least a plurality of Wave Division Multiplexers (WDM's) equivalent to the number of input first optical fibers, or, in the embodiment discussed above, 96 WDM's. Referring to FIG. 6 and to aid in the understanding of the present invention, there are shown two dashed lines. The area between the two dashed lines represents the enclosed portion 56 of distribution panel 42 whereas the area at each side of the two dashed lines represents the second out unenclosed portion 66 discussed above. Consequently, the two dashed lines are also labeled 61 and 64 representing the two internal ports discussed above. Thus, the 96 optical fibers carrying the bidirectional telephone signals are provided through internal port 61 to the Wave Division Multiplexer array 100. As was discussed above, the 96 fibers could be individual fibers provided to an array or, as shown in this preferred embodiment, represent 12 ribbons of 8 fibers each. Likewise, the 96 output or third optical fibers are seen as leaving the enclosed portion 56 and routed back to the second portion 66 past the dashed line representing the second internal port 64. Also as shown, the optical fiber 102 carrying the cable TV signals is shown being provided to an optical splitter 58 as was discussed heretofore. It will be appreciated of course that the optical splitter 58 may be comprised of any number of splitters combined in any suitable arrangement, so long as the output number of fibers is at least equal to the number of bidirectional telephone fibers provided to Wave Division Multiplexer array 100 and the number of output fibers leaving Wave Division Multiplexer array 100. For example, in the embodiment shown in FIG. 6, a first optical splitter 104 receives the input TV signals on optical fiber 102 and provides at least 6 outputs on lines 106a through 106f. These 6 outputs are then provided to 3 additional 2 by 32 splitters, 108a, 108b and 108c which in turn each provide 32 outputs for a total of 96 (3×32) optical fiber outputs from splitter 58 to Wave Division Multiplexer array 100.

As was discussed previously, the optical distribution panel of the present invention is suitable for mounting in presently available vertical optical distribution terminals and further includes brackets and dimensions such that it can also readily be mounted in a standard telephone Main Distribution Frame (MDF) which is presently used for receiving and distributing copper twisted pairs for telephone service.

The corresponding structures, materials, acts, and equivalents of all means or step plus function elements in the claims below are intended to include any structure, material, or act for performing the function in combination with other claimed elements as specifically claimed.

We claim:

1. Apparatus for distributing optical transmission paths comprising:
   a plurality of first optical fibers bidirectionally transmitting light at a first wavelength, each one of said plurality of first optical fibers having a first portion spliced to a second portion;
   a like plurality of second optical fibers transmitting light at a second wavelength;
   a like plurality of third optical fibers for simultaneously transmitting light at both said first and second wavelengths, each one of said plurality of third optical fibers having a first portion spliced to a second portion;
   a like plurality of wave division optical couplers, each having a first port connected to one of said plurality of first optical fibers, a second port connected to one of said plurality of second optical fibers, and a third port connected to one of said plurality of third optical fibers such that light having said first wavelength and received at said first port is combined with light having said second wavelength and received at said second port and said combined light is provided as an output to said third port, and light received at said third port as an input and having said first wavelength is provided as an output to said first port; and
   a support structure for supporting said first, second and third plurality of optical fibers and said wave division optical couplers.

2. The apparatus of claim 1 and further comprising:
   a first holding area for supporting splices joining said first portions and said second portions of said first optical fibers;
   a first pathway extending from a first external port to said first holding area for guiding and supporting said first portions of said plurality of first optical fibers;
   a second pathway extending from said first holding area to a first internal port for guiding and supporting said second portions of said plurality of first optical fibers;
   a second holding area for supporting splices joining said first and second portions of said third optical fibers;
   a third pathway extending from a second external port to said second holding area for guiding and supporting first portions of said plurality of third optical fibers; and
   a fourth pathway extending from said second holding area to a second internal port for guiding and supporting said second portion of said plurality of third optical fibers.

3. The apparatus of claim 1 and further comprising:
   an optical splitting device connected to at least one input fiber for receiving light at said second wavelength and a plurality of outputs for providing light at said second wavelength, said plurality of outputs connected one each to said plurality of second optical fibers, and said at least one input fiber having a first portion spliced to a second portion; and
   said first portion of said at least one input fiber routed along said first pathway and said second portion of said at least one input fiber routed along said second pathway.

4. The apparatus of claim 2 and further comprising:
   an optical splitting device connected to at least one input fiber for receiving light at said second wavelength and a plurality of outputs for providing light at said second wavelength, said plurality of outputs connected one each to said plurality of second optical fibers, and said at least one input fiber having a first portion spliced to a second portion; and
   said first portion of said at least one input fiber routed along said first pathway and said second portion of said at least one input fiber routed along said second pathway.

5. The apparatus of claim 1 wherein said plurality of first optical fibers are divided equally into twelve ribbons of eight optical fibers.

6. The apparatus of claim 1 wherein said plurality of third optical fibers are divided equally into eight ribbons of twelve optical fibers.

7. The apparatus of claim 5 wherein said plurality of third optical fibers are divided equally into eight ribbons of twelve optical fibers.

8. The apparatus of claim 2 wherein said plurality of first optical fibers are divided equally into twelve ribbons of eight optical fibers.

9. The apparatus of claim 2 wherein said plurality of third optical fibers are divided equally into eight ribbons of twelve optical fibers.

10. The apparatus of claim 3 wherein said plurality of first optical fibers are divided equally into twelve ribbons of eight optical fibers.

11. The apparatus of claim 3 wherein said plurality of third optical fibers are divided equally into eight ribbons of twelve optical fibers.

12. The apparatus of claim 1, wherein said support structure has dimensions and brackets suitable for mounting horizontally in a standard telephone Main Distribution Frame (MDF).

13. The apparatus of claim 1, wherein said support structure has dimension and brackets suitable for mounting vertically in a standard telephone Main Distribution Frame.

14. The apparatus of claim 1, wherein said support structure defines an enclosed portion for supporting said plurality of wave division optical couplers.

15. The apparatus of claim 3, wherein said support structure defines an enclosed portion for supporting said plurality of wave division optical coupler and said optical splitting device.

16. The apparatus of claim 2, wherein said support structure defines an enclosed portion and a second portion, said enclosed portion supporting said plurality of wave dimension optical couplers, and said second portion supporting said first and second holding areas and said first, second, third and fourth pathways.

17. The apparatus of claim 1, and further comprising an optical splitting device connected to at least one input fiber for receiving light at said second wavelength, said plurality of outputs connected one each to said plurality of second optical fibers, and said optical splitting device being supported by said enclosed potion of said support structure.

18. The apparatus of claim 1 wherein said plurality of wave division optical couplers is a Wave Division Multiplexer (WDM) array having at least said like plurality of Wave Division Multiplexer.

* * * * *